United States Patent
Huwiler et al.

(10) Patent No.: US 8,994,303 B2
(45) Date of Patent: Mar. 31, 2015

(54) METHOD AND DEVICE FOR DRIVING BRUSHLESS DIRECT-CURRENT MOTOR DURING DISPLACEMENT OF ACTUATING ELEMENT

(71) Applicants: Adrian Huwiler, Honau (CH); Ladislav Kucera, Thalwil (CH); Daniel Schoop, Zug (CH); Martin Zurfluh, Altdorf UR (CH)

(72) Inventors: Adrian Huwiler, Honau (CH); Ladislav Kucera, Thalwil (CH); Daniel Schoop, Zug (CH); Martin Zurfluh, Altdorf UR (CH)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 13/750,599

(22) Filed: Jan. 25, 2013

(65) Prior Publication Data
US 2013/0193889 A1    Aug. 1, 2013

(30) Foreign Application Priority Data
Jan. 26, 2012   (EP) .................................. 12152562

(51) Int. Cl.
*H02P 6/00* (2006.01)
*H02P 3/08* (2006.01)
*H02P 6/14* (2006.01)

(52) U.S. Cl.
CPC .. *H02P 6/00* (2013.01); *H02P 3/08* (2013.01); *H02P 6/002* (2013.01); *H02P 6/145* (2013.01)
USPC ................................. 318/400.01; 318/400.37

(58) Field of Classification Search
USPC .......... 318/400.01, 400.37, 400.38, 466, 468, 318/470
See application file for complete search history.

(56) References Cited

U.S. PATENT DOCUMENTS

| | | | | |
|---|---|---|---|---|
| 4,579,012 A * | 4/1986 | Mabie et al. | ................. | 74/89.34 |
| 4,663,892 A * | 5/1987 | Smith | .............................. | 451/49 |
| 5,320,421 A * | 6/1994 | Kade et al. | ..................... | 303/162 |
| 6,141,201 A | 10/2000 | Schmitz | | |
| 6,289,874 B1 * | 9/2001 | Keefover | ....................... | 123/399 |
| 6,840,200 B2 * | 1/2005 | Miller | ......................... | 123/90.11 |
| 7,053,583 B1 * | 5/2006 | Hazelton | .................. | 318/400.03 |
| 7,064,508 B2 * | 6/2006 | Keefover et al. | ............... | 318/434 |
| 7,855,525 B2 * | 12/2010 | Sanders et al. | ................ | 318/466 |

FOREIGN PATENT DOCUMENTS

| | | |
|---|---|---|
| DE | 198 07 875 A1 | 8/1999 |
| DE | 102 47 321 B3 | 2/2004 |
| DE | 10 2010 013 695 A1 | 10/2011 |
| EP | 2 239 174 A2 | 10/2010 |
| JP | 2001-65725 | 3/2001 |

* cited by examiner

*Primary Examiner* — Rina Duda
(74) *Attorney, Agent, or Firm* — Staas & Halsey LLP

(57) ABSTRACT

During displacement of an actuating element to a target position, a brushless direct-current motor is driven by a driving commutation pattern derived from rotor position signals. After the target position is reached the brushless direct-current motor is transferred to a holding mode in which it is driven by a commutation pattern providing a required holding torque. In the holding mode the holding current necessary for providing the required holding torque is minimized by an iterative holding current reduction method to a holding current value guaranteeing the required holding torque.

6 Claims, 3 Drawing Sheets

METHOD AND DEVICE FOR DRIVING BRUSHLESS DIRECT-CURRENT MOTOR DURING DISPLACEMENT OF ACTUATING ELEMENT

CROSS REFERENCE TO RELATED APPLICATIONS

This application is based on and hereby claims priority to European Application No. 12152562 filed on Jan. 26, 2012, the contents of which are hereby incorporated by reference.

BACKGROUND

Described below are a method and a device for driving a brushless direct-current motor during the displacement of an actuating element.

Brushless direct-current motors are already well-known. In the motors, the otherwise customary mechanical commutator, which has brushes for reversing the current direction, is replaced by an electronic circuit. Furthermore, brushless direct-current motors have a rotor equipped with permanent magnets and a stator having windings. The windings of the stator are energized with a time offset by the electronic circuit in order to generate a rotating field which produces a torque at the permanently excited rotor. The commutation pattern by which the stator windings are energized is determined on the basis of an evaluation of rotor position signals which are provided by Hall-effect sensors and supplied to the electronic circuit. The latter energizes the stator windings by way of drivers or amplifiers which have, for example, power transistors or power MOSFETs as electronic switches.

DE 10 2006 003 151 A1 discloses a control method for a brushless direct-current motor in which a desired number of revolutions of the brushless direct-current motor is predefined, the number of revolutions is converted into a required number of revolutions, a first supply current activating the brushless direct-current motor is supplied thereto, the revolution pulses generated during a rotation of the brushless direct-current motor are counted, the number of counted revolution pulses is compared with the number of required revolution pulses, and a second supply current dependent on the comparison result is supplied to the brushless direct-current motor. In order to bring the brushless direct-current motor to a stop, the rotation of the motor is halted either by setting the supply current to zero or by supplying equal multiphase currents to the stator windings.

Furthermore, it is already known to employ brushless direct-current motors as valve drives or throttle actuators. During their lifetime these are supplied with current for the majority of the time. In the absence of suitable measures, the torque required in the holding mode of the drives or actuators in order to keep them stationary is generated by the amplifier. This circumstance generates losses both in the motor and in the amplifier.

If the brushless direct-current motor displaces the actuating element from a position A to a target position B, then a position control function is active. In this case the motor is driven by a driving commutation pattern derived from rotor position signals. The rotor position signals are in this case derived from the output signals of, for example, three Hall-effect sensors. In principle it is possible to hold the actuating element at its target position by a control function of the type. However, the motor always moves a little due to the comparatively coarse position resolution, which is attributable to the fact that only the Hall-effect signals of the Hall-effect sensors are evaluated. This has a negative impact on the life expectancy of the gearing mechanism and also on noise generation. Consequently, after the target position is reached the brushless direct-current motor transitions into a holding mode in which it is driven by a commutation pattern providing a required holding torque.

It is disadvantageous in this case that a continuous flow of current must be provided to produce the holding effect. The strength of the current, i.e. the holding current value, is based in this case on the maximum holding torque which the brushless direct-current motor is required to make available according to its datasheet. Furthermore, a reserve must additionally be factored in to enable tolerances in series production to be compensated for.

Depending on the installation position and weight of the displacement element, the required holding torque, which holds the displacement element in its target position, may be very small. If the mechanical friction present is sufficient in itself to hold the displacement element in its target position, then the holding torque can have the value zero. With known drives, in a situation of this kind, the motor is nonetheless supplied with current at the full holding torque. This is uneconomic from the energy perspective.

SUMMARY

A method and a device are described below for driving a brushless direct-current motor during the displacement of an actuating element, wherein the consumption of energy is reduced.

Described below is a method for driving a brushless direct-current motor during the displacement of an actuating element, wherein during the displacement of an actuating element to a target position the brushless direct-current motor is driven by a driving commutation pattern derived from rotor position signals and after the target position is reached it transitions into a holding mode in which it is driven by a commutation pattern providing a required holding torque, the holding current necessary in the holding mode in order to provide the required holding torque being minimized to a holding current value guaranteeing the required holding torque by an iterative holding current reduction method.

Also described is a device for driving a brushless direct-current motor during the displacement of an actuating element which is provided with an electronic circuit, a drive connected to the electronic circuit, a brushless direct-current motor connected to the driver, and an actuating element activated by the brushless direct-current motor, wherein the electronic circuit is embodied to provide the brushless direct-current motor with a driving commutation pattern derived from rotor position signals by way of the driver during the displacement of the actuating element to a target position and after the target position is reached to transition the brushless direct-current motor into a holding mode in which the electronic circuit provides the brushless direct-current motor with a commutation pattern providing a required holding torque by way of the driver, wherein the electronic circuit is embodied to minimize the holding current necessary for providing the required holding torque in the holding mode to a holding current value guaranteeing the required holding torque by an iterative holding current reduction method.

The advantages of the of the method include the energy consumption of the motor and also the energy consumption in the driver or amplifier being reduced to the minimum necessary in each case.

The rotor position signals may be provided by Hall-effect sensors. Three Hall-effect sensors are advantageously used in this case. The signals supplied by the Hall-effect sensors are used for ascertaining the rotor position information and for determining the commutation pattern. No further sensors are needed for determining the rotor position.

Further advantages of the method are that no self-locking motor and also no self-arresting or brakable mechanism are required.

BRIEF DESCRIPTION OF THE DRAWINGS

These and other aspects and advantages will become more apparent and more readily appreciated from the following description of the exemplary embodiments, taken in conjunction with to the accompanying drawings, in which.

DETAILED DESCRIPTION OF THE PREFERRED EMBODIMENT

Figure 1:
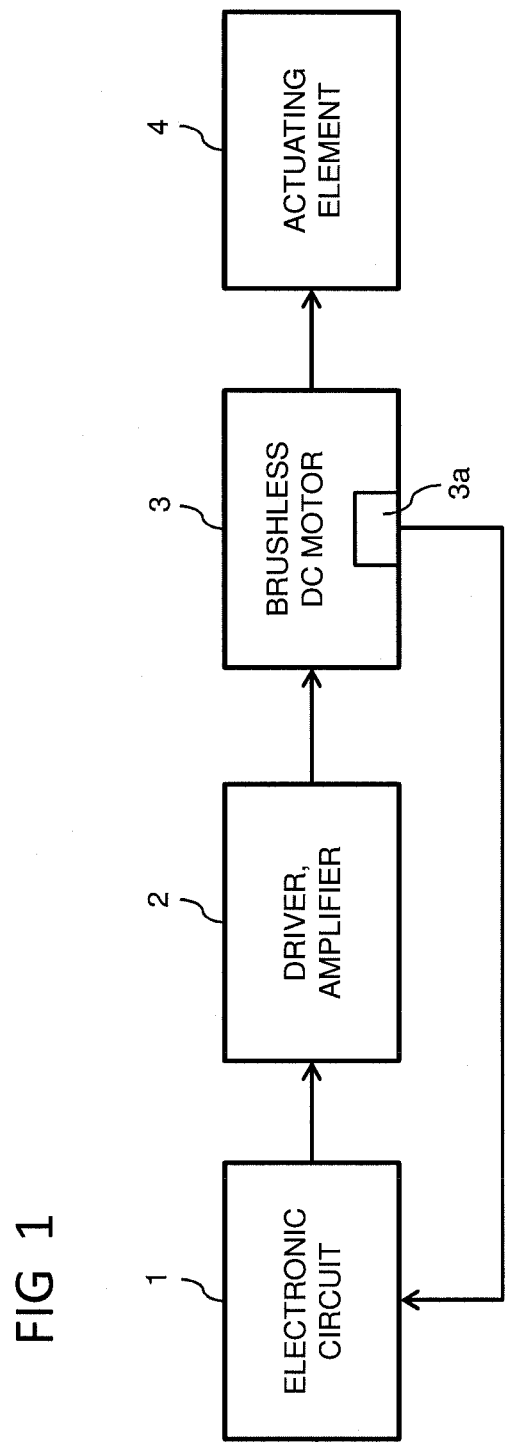
FIG. 1 shows a block diagram of a device for displacing an actuating element.

Reference will now be made in detail to the preferred embodiments, examples of which are illustrated in the accompanying drawings, wherein like reference numerals refer to like elements throughout.

FIG. 1 shows a block diagram of a device for displacing an actuating element. The device has an electronic circuit 1, a driver or amplifier 2, a brushless direct-current motor 3 equipped with a total of three Hall-effect sensors 3a, and a displacement element 4.

The brushless direct-current motor 3 has a stator equipped with stator windings and a rotor containing permanent magnets. The stator windings of the brushless direct-current motor 3 are energized by the electronic circuit 1, which may be a microcomputer, by way of the driver or amplifier 2 by a commutation pattern. The commutation pattern is determined by the electronic circuit 1 using the rotor position signals supplied by the Hall-effect sensors 3a.

In the exemplary embodiment shown, the displacement element 4 is a valve or throttle. The displacement element 4 is moved from a starting position A to a target position B using the commutation pattern, which is a driving commutation pattern.

Figure 2:
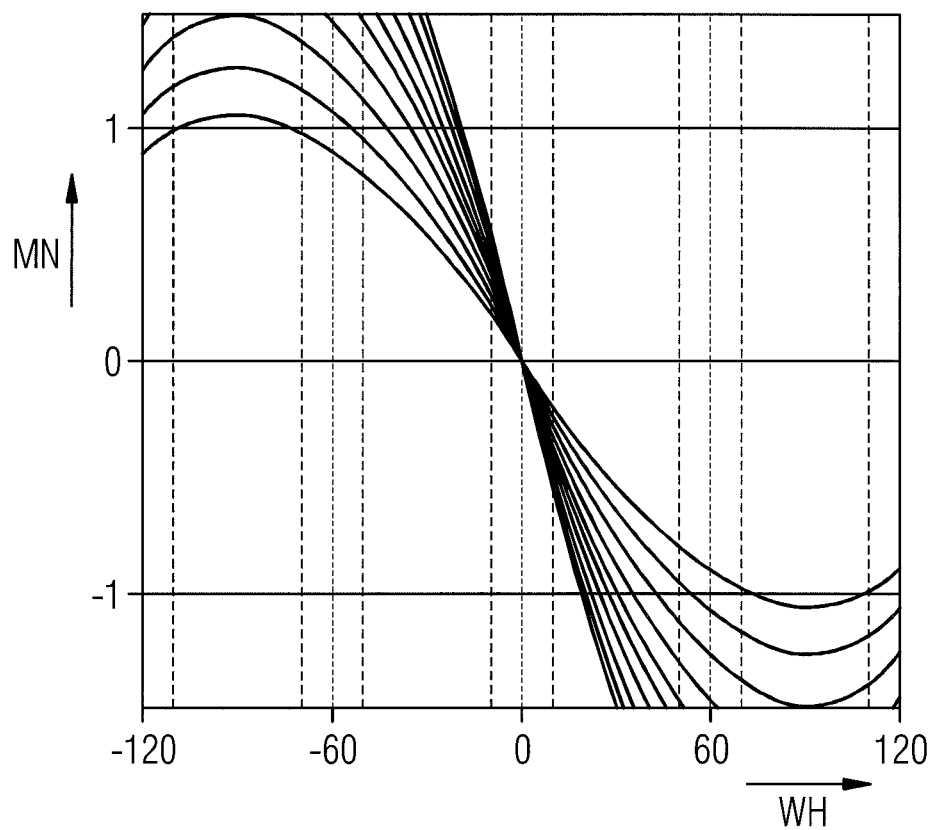
FIG. 2 is a graph illustrating the minimizing of the holding current.

Once the displacement element has reached its target position, the drive transitions to a holding mode. In so doing it stops at a Hall transition, referred to in the following as a zero degree line. The zero degree line is shown in FIG. 2, in which the Hall angle WH is plotted in degrees along the abscissa and the normalized torque MN is plotted along the ordinate. The zero degree line is located at the Hall angle WH=0°.

If a holding current is now applied, the motor is always pulled in the direction of the zero degree line. The closer it gets to the zero degree line, the smaller becomes the motor force pulling it in the direction. If a torque is present at the motor, then a position of equilibrium is established to the left or right of the zero degree line by the holding torque of the motor.

The holding current is now minimized by the method until the position of equilibrium, illustrated by dots in FIG. 2, crosses the +60° line or the −60° line. Thereafter the current is increased again and a state of equilibrium is produced at a lower current. If the required holding torque is very small, then the holding current can be reduced to 0 A.

It is illustrated in FIG. 2 that the holding current is reduced by an iterative holding current reduction method until, as in the exemplary embodiment shown, a position of equilibrium is established at WH=−70° and MN=1. The smaller the amplitude of the sinusoidal oscillation, the smaller is the holding current IH.

Because Hall-effect sensors measure a magnetic field, they are subject to hysteresis. This is indicated in FIG. 2 by the vertically running dashed lines. With the reduction in the current, the −60° line, for example, is sensed at −70°. The current is subsequently increased until the −50° line is reached. The reduction cycle then starts over from the beginning. Without additional measures this closed loop would continue indefinitely. However, this has the disadvantages that the motion is visible, the gearing mechanism can be damaged and the current triangle formed can be large, thereby resulting in unnecessarily high energy consumption.

In the method described herein, the iterative holding current reduction method is for this reason aborted after a predefined number of cycles and the current value then present is used as the minimized holding current value.

Figure 4:
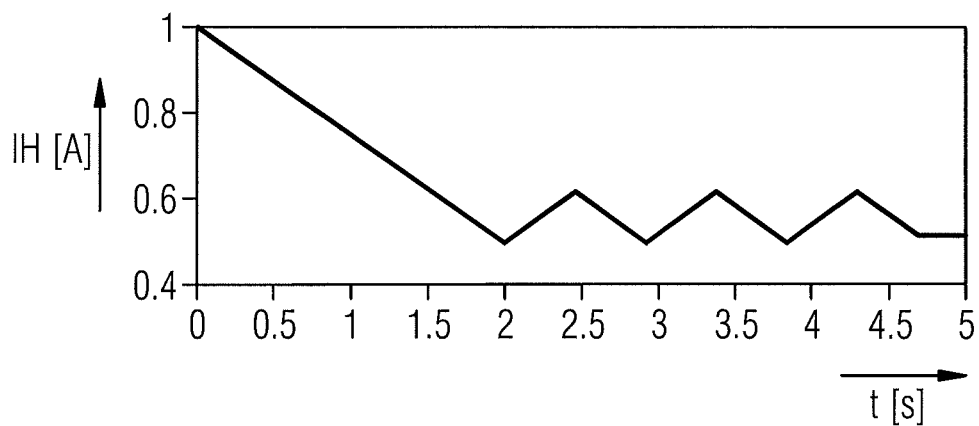
FIG. 4 is a graph illustrating the minimizing of the holding current when a large load torque is present.

In the exemplary embodiment shown in FIG. 4 the iterative holding current reduction method is aborted after a total of three cycles at a Hall angle WH close to −70°. The holding current is at its lowest at this point.

Figure 3:
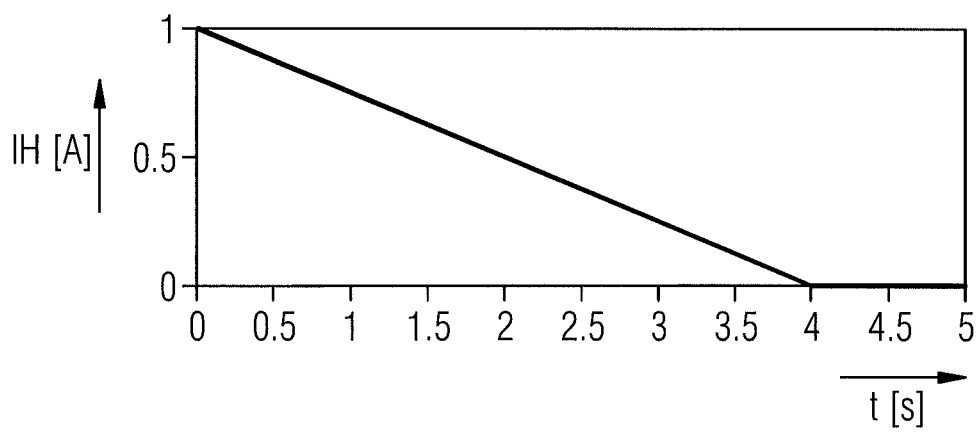
FIG. 3 is a graph illustrating the minimizing of the holding current when a small load torque is present.

FIG. 3 shows a diagram intended to illustrate the minimizing of the holding current when a small load torque is present. In this case the time t is plotted in seconds along the abscissa and the holding current IH is plotted in amperes along the ordinate. The variation of the holding current over time shown in the diagram makes it clear that when a small load torque is present the holding current can be reduced or minimized down to 0 A by application of the described holding current reduction method.

FIG. 4 shows a diagram intended to illustrate the minimizing of the holding current when a large load torque is present. In this figure, too, the time t is plotted in seconds along the abscissa and the holding current IH is plotted in amperes along the ordinate. The variation of the holding current shown in the diagram makes it clear that when a large load torque is present the holding current decreases as a result of an application of the described holding current reduction method initially from 1 A to 0.5 A, then forms three successive current triangles at which it increases again in each case up to 0.6 A and then drops off again in each case to 0.5 A and that at the end of the third current triangle the holding current value is frozen at 0.5 A. The holding current value of 0.5 A is then used as the minimized holding current value.

The number of cycles or current triangles after which the iterative holding current reduction method is aborted can also be 2 or greater than 3. For example, the number of cycles or current triangles after which the iterative holding current reduction method is aborted can also be 4, 5, 6, 7, etc.

The minimized holding current value determined by the described holding current reduction method is large enough in each case that at the load torque present in each case it is sufficiently large to hold the actuating element in its target position. Factoring in an additional reserve in order to compensate for manufacturing tolerances is not necessary.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

What is claimed is:

1. A method for driving a brushless direct-current motor that is not self-locking, during the displacement of an actuating element, the brushless direct-current motor having a rotor equipped with permanent magnets and a stator with windings, said method comprising:

driving the brushless direct-current motor during the displacement of the actuating element to a target position by a driving commutation pattern derived from rotor position signals provided by Hall-effect sensors subject to hysteresis;

transitioning the driving the brushless direct-current motor after the target position is reached to a holding mode in which the driving is by a commutation pattern providing a required holding torque, using a holding current necessary to provide the required holding torque that is minimized by an iterative holding current reduction method to the holding current value guaranteeing the required holding torque; and aborting the iterative holding current reduction method after a predefined number of cycles determined by hysteresis and maintaining the holding current value then present as a minimized holding current value.

2. The method as claimed in claim 1, wherein a valve or throttle is displaced by the brushless direct-current motor.

3. The method as claimed in claim 2, wherein when a small required holding torque is present the holding current value is reduced to 0 A.

4. A device for driving a brushless direct-current motor during the displacement of an actuating element, comprising:

a driver;

a brushless direct-current motor, connected to the driver and not self-locking, having a rotor equipped with permanent magnets and a stator with windings;

an actuating element activated by the brushless direct-current motor;

Hall-effect sensors, subject to hysteresis, outputting rotor position signals; and an electronic circuit, connected to the driver, to provide the brushless direct-current motor with a driving commutation pattern derived from the rotor position signals via the driver during displacement of the actuating element to a target position and after the target position is reached, to transition the brushless direct-current motor into a holding mode in which the electronic circuit provides the brushless direct-current motor with a holding commutation pattern providing a required holding torque via the driver, to minimize the holding current necessary for providing the required holding torque in the holding mode to a holding current value guaranteeing the required holding torque using an iterative holding current reduction method, and to abort the iterative holding current reduction method after a predefined number of cycles determine a minimized holding current value producing the required holding torque.

5. The device as claimed in claim 4, wherein the device has three Hall-effect sensors.

6. The device as claimed in claim 5, wherein the actuating element is one of a valve and a throttle.

* * * * *